US007012636B2

(12) United States Patent
Hatanaka

(10) Patent No.: US 7,012,636 B2
(45) Date of Patent: Mar. 14, 2006

(54) ELECTRONIC CAMERA AND ELECTRONIC CAMERA SYSTEM

(75) Inventor: Koji Hatanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 835 days.

(21) Appl. No.: 09/951,459

(22) Filed: Sep. 14, 2001

(65) Prior Publication Data

US 2002/0033886 A1    Mar. 21, 2002

(30) Foreign Application Priority Data

Sep. 18, 2000  (JP) .............................. 2000/281292

(51) Int. Cl.
*H04N 5/232* (2006.01)
(52) U.S. Cl. .................. 348/211.99; 348/207.11; 348/211.4; 348/211.8; 348/207.99
(58) Field of Classification Search .......... 348/207.11, 348/211.99, 211.4, 211.8, 211.1, 211.13, 348/207
See application file for complete search history.

(56) References Cited

U.S. PATENT DOCUMENTS

| 3,924,263 | A | * | 12/1975 | Alessi ........................ 396/237 |
| 4,218,702 | A | * | 8/1980 | Brocard et al. ............. 348/144 |
| 5,675,358 | A | * | 10/1997 | Bullock et al. ............. 345/420 |
| 5,943,050 | A | * | 8/1999 | Bullock et al. ............. 345/783 |
| 6,161,933 | A | * | 12/2000 | Tschida et al. ............. 352/179 |
| 6,262,767 | B1 | * | 7/2001 | Wakui .................... 348/211.99 |
| 6,535,243 | B1 | * | 3/2003 | Tullis ...................... 348/207.1 |
| 6,583,809 | B1 | * | 6/2003 | Fujiwara .................. 348/14.12 |
| 6,628,325 | B1 | * | 9/2003 | Steinberg et al. ........ 348/211.1 |

* cited by examiner

*Primary Examiner*—Aung Moe
*Assistant Examiner*—Chriss S. Yoder, III
(74) *Attorney, Agent, or Firm*—Fitzpatrick, Cella, Harper & Scinto

(57) ABSTRACT

When a shutter button of an electronic camera is depressed, the electronic camera photographs a subject and the photographed image data is stored into a main storage device of the electronic camera. Upon receiving a photography command from a computer connected to the electronic camera, a check is made to determine whether the main storage device of the electronic camera still holds image data to be processed. If the main storage device still holds image data to be processed, then an error signal is sent to a device from which the photography command is issued. If the main storage device does not hold image data to be processed, then the electronic camera photographs a subject and the photographed image is stored into the main storage device. Then, a notice of normal termination is sent to a device from which the photography command is issued. If the main storage device still holds image data to be processed, then the compressing, saving, or transferring of the image data in the main storage device is carried out on a predetermined data volume basis.

11 Claims, 11 Drawing Sheets

ELECTRONIC CAMERA AND ELECTRONIC CAMERA SYSTEM

FIELD OF THE INVENTION

The present invention relates to an electronic camera such as a digital camera, and an electronic camera system that incorporates an electronic camera and a camera-controlling device for controlling the electronic camera from outside.

RELATED BACKGROUND ART

A system is known in which a camera body is connected to a computer and the computer provides a photography command at predetermined time intervals (interval photography) or after a predetermined time elapse (timer photography) to the electronic camera body under the control of a timer incorporated in the computer so that the electronic camera takes pictures.

A conventional system has the following drawbacks. When an electronic camera has been set to a timer photography mode or an interval photography mode, the camera can be operated only in a specified mode and does not respond to the actuation of a shutter button of the electronic camera. Thus, when the user wishes to take a picture by actuating the shutter button during the timer photography or the interval photography, the user is not allowed to do so before causing the computer to cancel the timer photography mode or the interval photography mode.

SUMMARY OF THE INVENTION

An object of the present invention is to provide an electronic camera and an electronic camera system in which the aforementioned drawbacks are solved.

Another object of the present invention is to provide an electronic camera and an electronic camera system in which photography can be performed using a shutter button of the camera body immediately whenever necessary, even when the electronic camera is under the control of an external controller.

Other objects of the present invention will become apparent from the claims and the description with reference to the accompanying drawings.

DETAILED DESCRIPTION OF PREFERRED EMBODIMENTS

Embodiments of the present invention will be described in detail with reference to the drawings.

Figure 1:
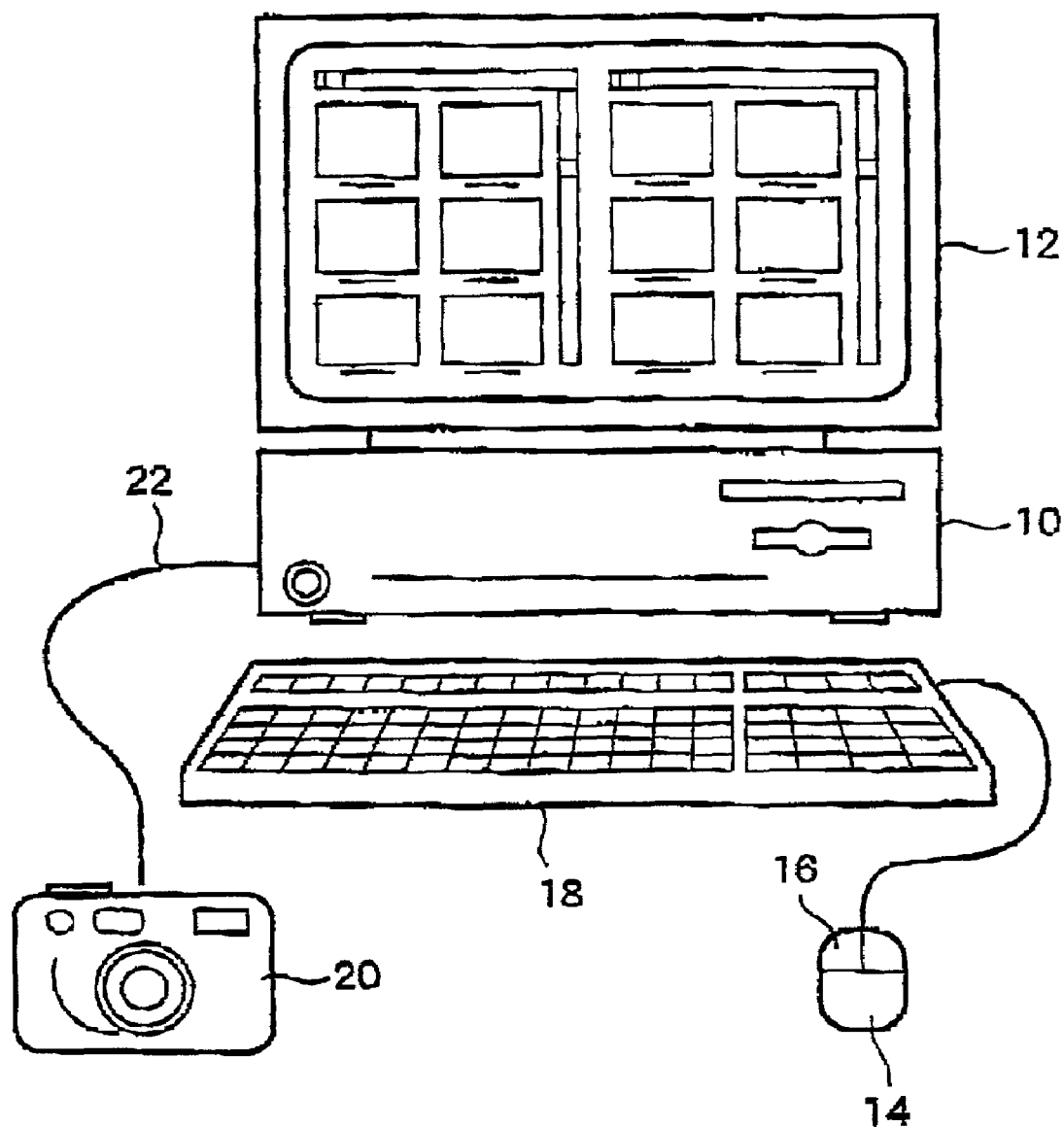
FIG. 1 is a general view of devices, illustrating a configuration of an electronic camera system according to the present invention.

FIG. 1 is a general view illustrating a general configuration of an embodiment of the present invention. Reference numerals 10 and 12 denote a computer and a monitor that displays an image of an output of the computer 10, respectively. Reference numerals 14, 16, and 18 denote a mouse as a pointing device, a mouse button, and a keyboard, respectively. Reference numeral 20 denotes an electronic camera (digital still camera), which is connected to the computer 10 via a data transferring cable 22 such as a USB (universal serial bus).

Figure 2:
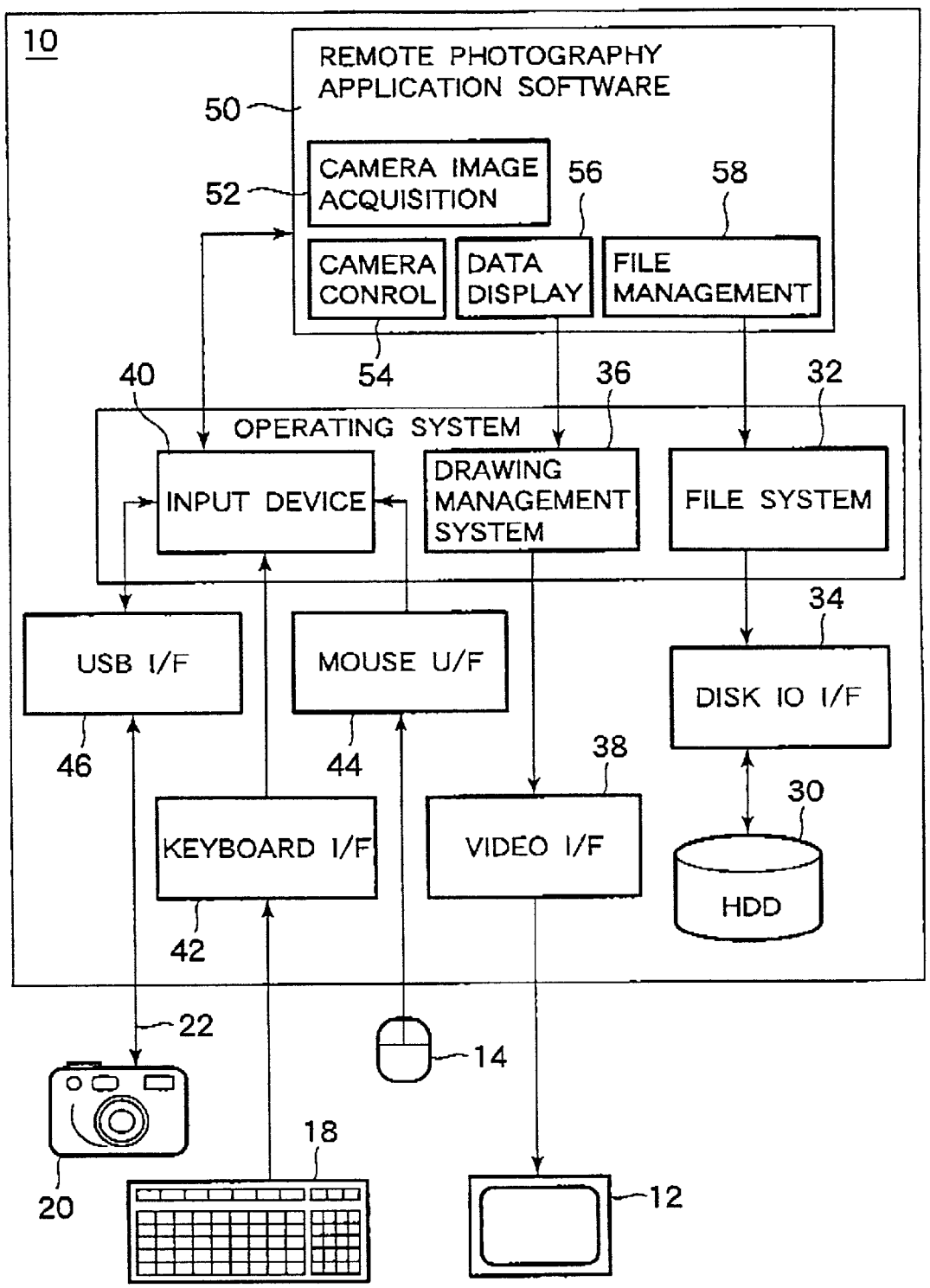
FIG. 2 is a schematic block diagram illustrating a general configuration of an electronic camera system.

FIG. 2 is a functional block diagram illustrating the embodiment. The computer 10 has an operating system that runs on the hardware, and application software that runs on the operating system. The operating system and application software are executed by a CPU, not shown. Structural elements not directly required for understanding the configuration of the embodiment have been omitted. Such structural elements include, for example, a CPU, a memory, and a memory management system that manages the operating system.

Reference numerals 30 and 32 denote a hard disk as an auxiliary memory device, and a file system that forms a part of the operating system, respectively. The file system has a function that allows inputting and outputting of files without the application software directly controlling the hardware. Such a file system is well-known. Reference numeral 34 is a disk I/O interface through which the file system 32 reads data from and writes data into the hard disk 30.

Reference numeral 36 denotes a drawing management system that is resident in the operating system. The drawing management system 36 has a function where an image can be produced with the application software not directly controlling the hardware. Reference numeral 38 denotes a video interface that converts image data produced in the drawing management system 36 into a video signal that can be displayed on the monitor 12.

Reference numeral 40 denotes an input device management system that forms a part of the operating system. The input device management system 40 provides means for receiving an input from the user with the application software not directly controlling the hardware. The input device management system 40 includes a USB host system that becomes a host system when the USB equipment is used. Reference numerals 42, 44, and 46 denote a key board interface to which the key board 18 is connected, a mouse interface to which the mouse 14 is connected, and a USB interface, respectively.

The electronic camera 20 is connected through the USB cable 22 to the USB interface 46 and transmits and receives control commands, state signals, and image data between the application software through the input device management system 40.

Reference numeral 50 is a remote photography application software that controls the electronic camera 20 and manages images photographed by the electronic camera 20. The remote photography application software has camera image acquisition means 52 that communicates with the electronic camera 20 to acquire an image captured by the electronic camera 20; camera controlling means 54 that sets various parameters for the electronic camera 20 to control its photographing operation; data display means 56 that displays images captured by the electronic camera 20 and other information on the screen of the monitor 12; and file management means 58 that stores photographed image data transferred from the electronic camera 20 into the hard disk 30 and manages the photographed image data.

Figure 3:
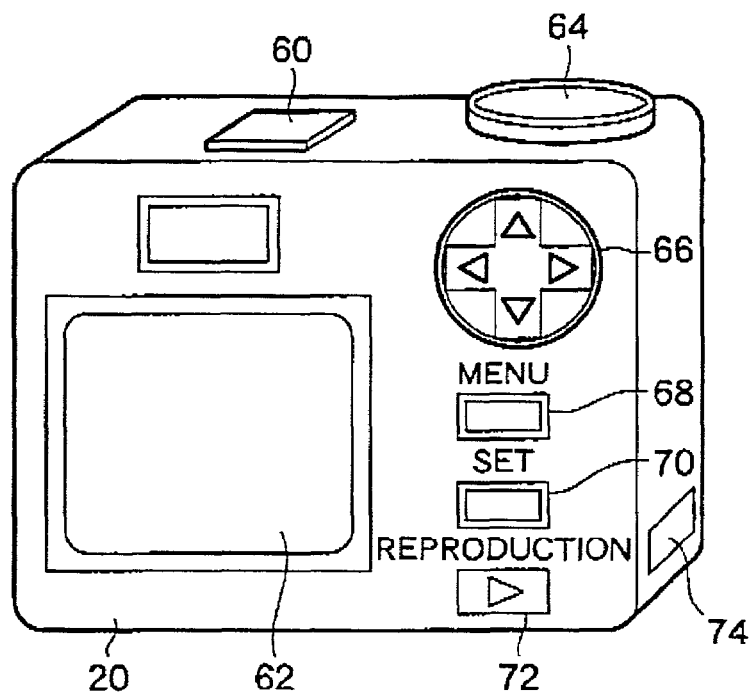
FIG. 3 is a perspective view, illustrating an outer appearance of an electronic camera 20.

FIG. 3 shows a partial appearance of the electronic camera 20. Reference numerals 60, 62, and 64 denote a power button, a liquid crystal display panel, and a shutter button, respectively. Reference numerals 66, 68, and 70 denote an operation button, a menu button, and a setting button, respectively. Reference numerals 72 and 74 denote a reproduction button and a USB connector, respectively.

When the menu button 66 is pressed, the control menu for the camera 20 appears on the screen of the liquid crystal display panel 62. The user operates the operation button 66 and setting button 70 to change the settings of the electronic camera 20. When the shutter button 64 is pressed, photographing is performed. The photographed image data is stored as a JPEG file in an image memory in the electronic camera 20. When the user operates the reproduction button 72, the photographed image stored in the image memory is reproduced and displayed on the liquid crystal display panel 62. Up to this operation, the embodiment operates just as in the conventional electronic camera.

Figure 4:
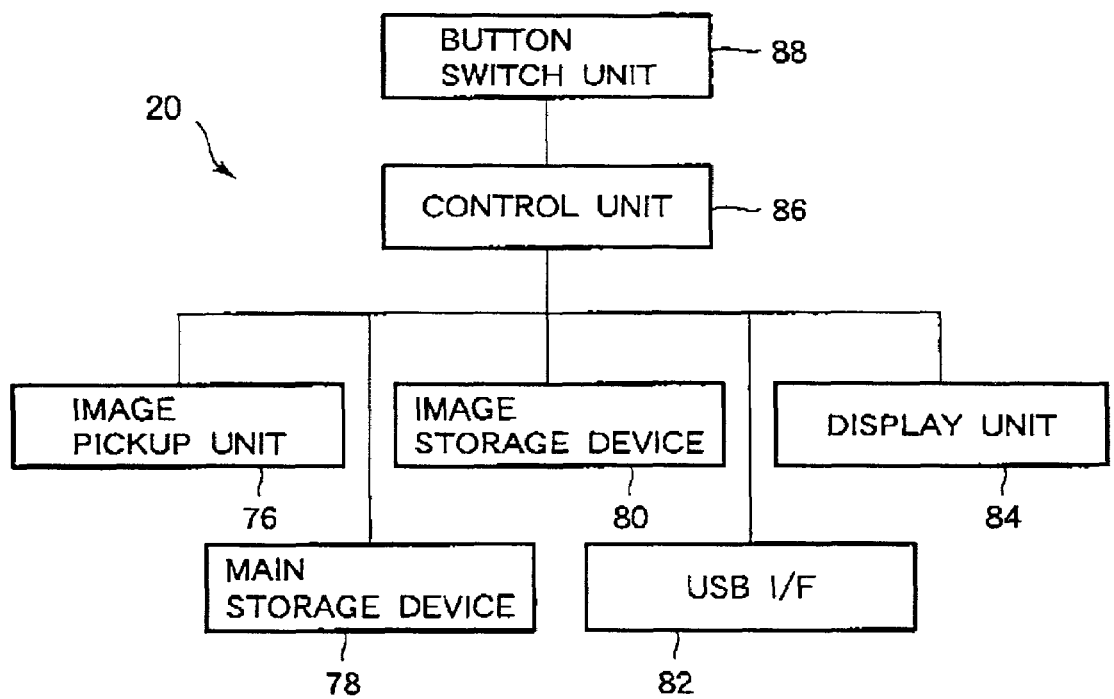
FIG. 4 is a schematic block diagram illustrating a general configuration of the electronic camera 20.

FIG. 4 is a block diagram illustrating a general configuration of the electronic camera 20. However, FIG. 4 shows only functional blocks required for understanding the functions of the present embodiment. The image pickup unit 76 includes a photography lens and a photography element, and outputs a photographed image as image data. The main storage device (buffer memory) 78 temporarily stores the image data received from the image pickup unit 76 and provides a memory space required for carrying out the various processes in the electronic camera 20. The image storage device 80 stores the image data, temporarily stored in the main memory 78, as a file. The image storage device 80 includes a flash memory card as a storage medium that can be detachably mounted. The image storage device 80 may take the form of a recording medium such as a magneto-optical disk. Reference numerals 82 and 84 denote a USB interface and a display unit that includes an image reproduction circuit and a liquid crystal display panel 62, respectively. Reference numerals 86 and 88 denote a control unit that controls the entire operation of the electronic camera 20 and a button switch unit that transmits to the control unit 86 the operation of the switch 60 and buttons 64–72 described with reference to FIG. 3.

Figure 5:
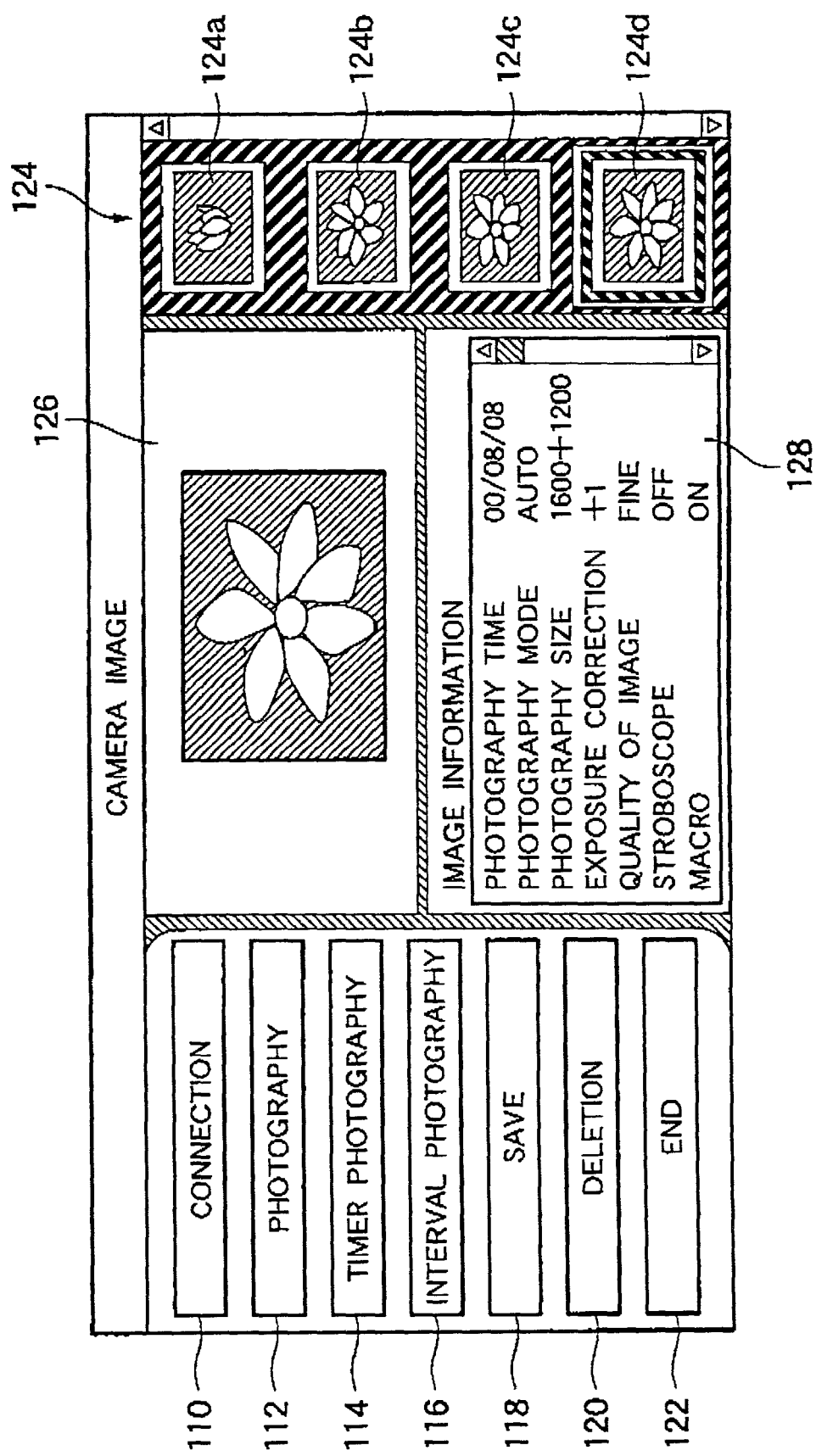
FIG. 5 illustrates an example of display of remote photography application software.

FIG. 5 illustrates an example of display under the control of the application software that runs on the computer 10 to control the electronic camera 20. This software runs on the computer 10 to remote-control the electronic camera 20 over the USB cable 22.

Reference numerals 110, 112, and 114 denote a connection button that commands connection to the electronic camera 20, a photography button, and a timer photography button, respectively. Reference numerals 116, 118, 120, and 122 denote an interval photography button, a save button, a deletion button, and an end button, respectively.

Operating the connection button 110 establishes the connection with the electronic camera 20. Operating the photography button 112 issues to the electronic camera 20 a photography command that commands photographing. The image photographed by the electronic camera 20 is transferred to the computer 10 over the USB cable 22 and displayed as a reduced image in a reduced photographed image displaying area 124. Reference numerals 124a–124d denote examples of reduced images. When a desired one of reduced images 124a–124d in the reduced photographed image displaying area 124 is selected by the use of the mouse, the selected image is enlarged and displayed in a photographed image displaying area 126. Further, various other information on the selected image is displayed in an image information displaying area 128.

Figure 6:
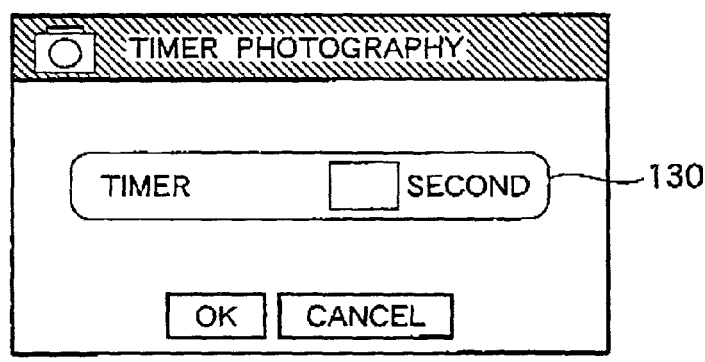
FIG. 6 illustrates an example of display of a timer photography mode.

When the timer photography button 114 is operated, a timer photography setting dialog as shown in FIG. 6 is displayed, so that the user can input a desired number of seconds into the timer-setting inputting field 130. The computer 10 issues a photography command to the electronic camera 20 after the number of seconds inputted into the timer-setting inputting field 130. The electronic camera 20 performs photography upon receiving the photography command, and transfers the photographed image to the computer 10.

Figure 7:
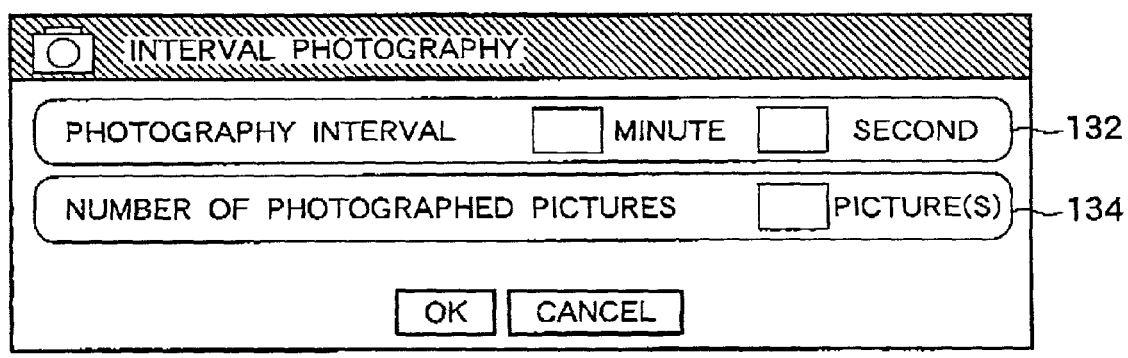
FIG. 7 illustrates an example of display of an interval photography mode.

When the interval photography button 116 is operated, the interval photography setting dialog as shown in FIG. 7 is displayed, so that the user can input a time interval between adjacent photographing operations into a photography time interval inputting field 132 and the number of photographs into a number-of-photographs inputting field 134. The computer 10 provides the photography command to the electronic camera 20 until the number of photographs inputted in the number-of-photographs inputting field 134 is reached, the photography command being outputted at the photography time intervals inputted in the photography time interval inputting field 132. In this manner, the electronic camera 20 takes as many pictures as was inputted in the number-of-photographs inputting field 134 at the time intervals inputted in the photography time interval inputting field 132.

When the save button 118 is operated, the image selected on the reduced photographed image display area 124 is saved as a file in the hard disk of the computer 10. By means of a known method, the user is allowed to select an area in the hard disk into which the image is stored.

Operating the deletion button 120 causes the image selected in the reduced photographed image displaying area 124 to be deleted from the area in the hard disk into which the image was saved.

Operating the end button 122 disables the connection between the electronic camera 20, and the application software is terminated accordingly.

Figure 8:
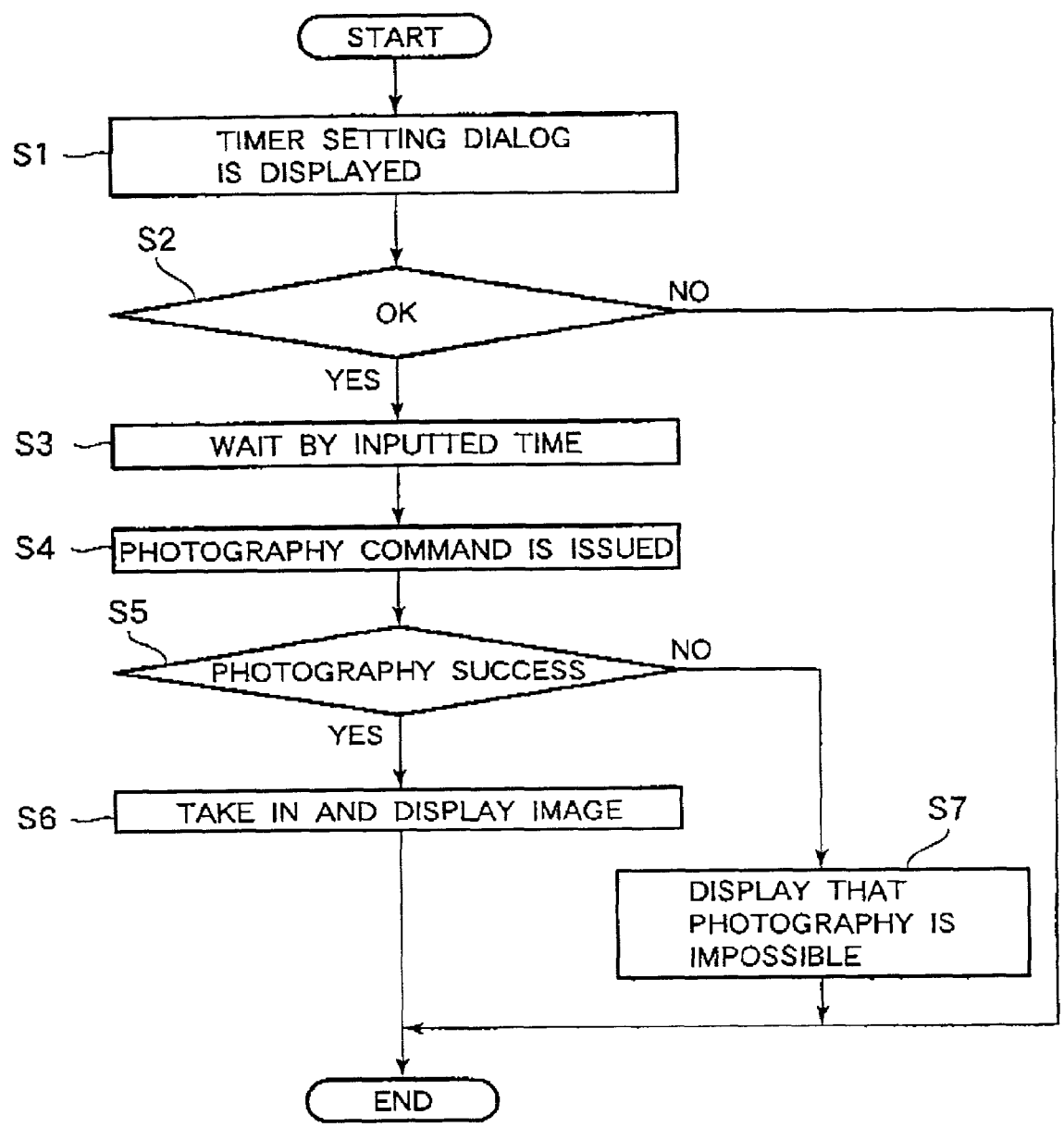
FIG. 8 is a flowchart, illustrating the operation in the timer photography mode performed by the remote photography application software.
Figure 9:
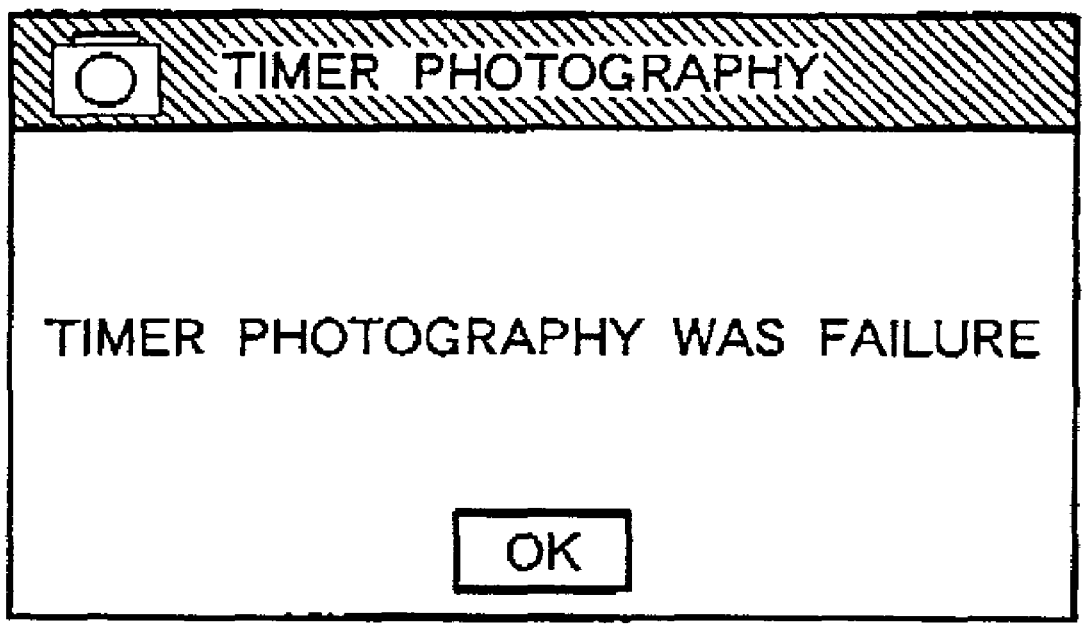
FIG. 9 illustrates an example of error display in the timer photography mode.

FIG. 8 is a flowchart illustrating the operation in the timer photography mode according to the embodiment. When the timer photography button 114 is depressed, the timer photography setting dialog as shown in FIG. 6 is displayed (S1). When the number of seconds is inputted and then the OK button is depressed so that system is in the timer photography mode (S2), the system waits by the time inputted in the timer photography setting dialog (S3), and then issues the photography command to the electronic camera 20 (S4). When the photographing is successfully performed (S5), the photographed image data is transferred from the electronic camera 20 to the computer 10, so that a reduced image of the transferred image is displayed in the reduced photographed image displaying area 124 (S6). If the photographing is not successfully performed (S5), a timer photography mode failure dialog as shown in FIG. 9 is displayed to indicate the failure of the timer photography to the user (S7).

Figure 10:
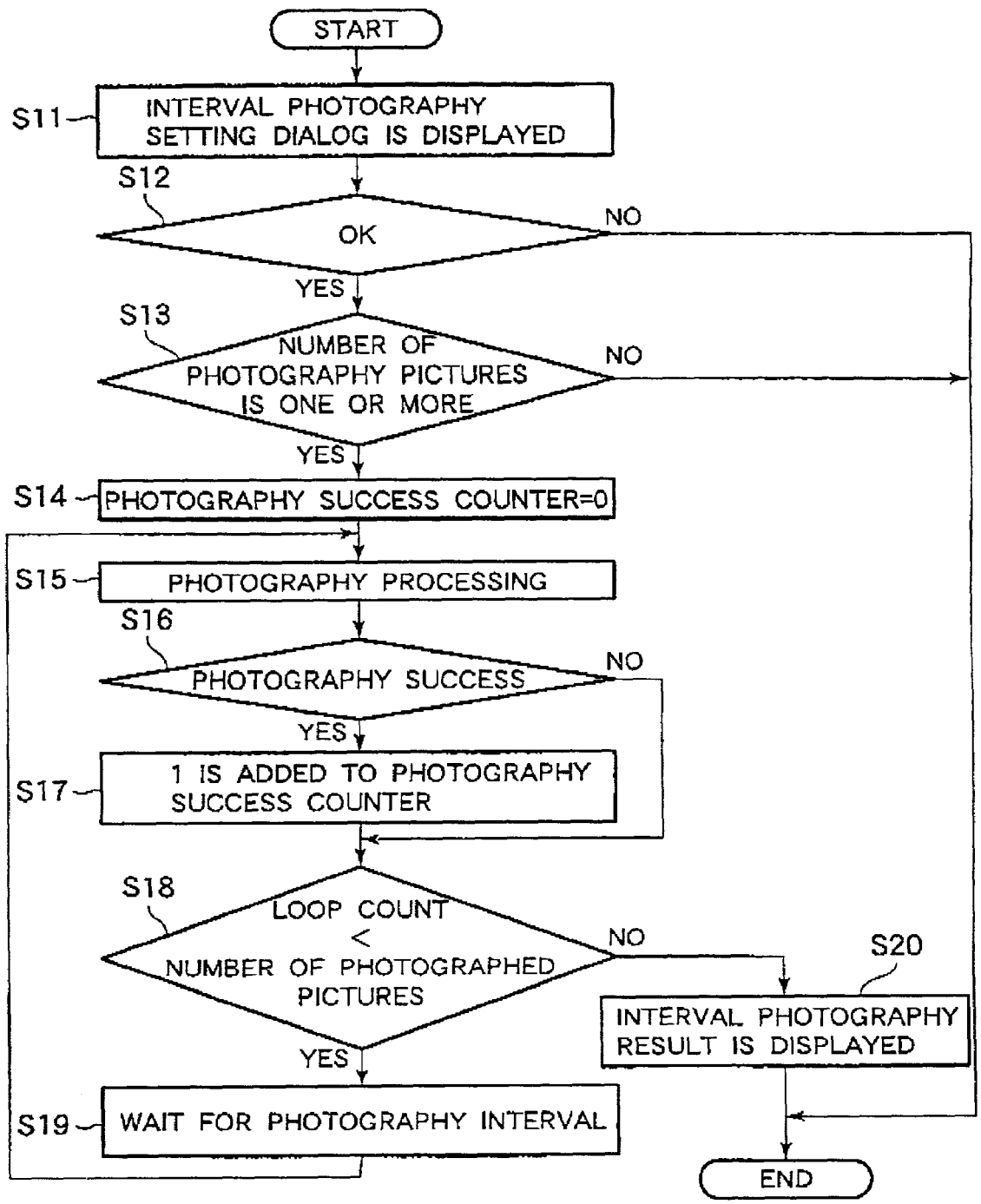
FIG. 10 is a flowchart, illustrating the operation in the remote photography mode by the remote photography application software.

FIG. 10 is a flowchart illustrating the operation of the interval photography mode in the present embodiment.

When an interval photography button 116 is depressed, an interval photography setting dialog as shown in FIG. 7 is displayed (S11). If a cancel button in this dialog is selected, the process is terminated (S12). When the photography time interval is inputted and the OK button is depressed (S12), a check is made to determine whether the inputted number of pictures is one or more (S13). If the inputted number of pictures is less than one, the process is terminated.

Figure 11:
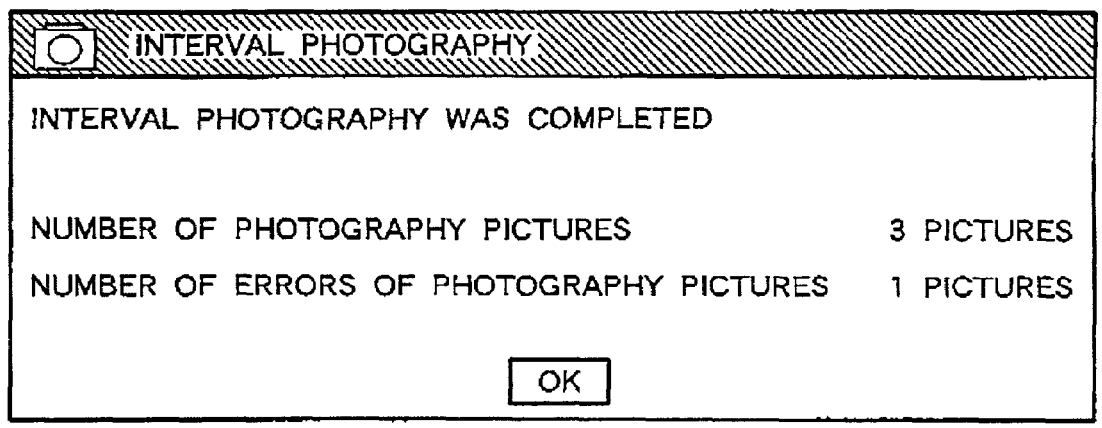
FIG. 11 illustrates an example of error display in the interval photography mode.

If the inputted number of pictures is one or more (S13), a photography success counter that counts the number of successfully photographed pictures is set to "0" (S14). When the photography command is transferred to the electronic camera 20, the camera 20 performs the photography processing (S15), and the photographing is successfully (S16) performed, the photographed images are transferred from the electronic camera 20 just as in the timer photography mode, so that a reduced image is displayed. Then, 1 is added to the photography success counter (S17). If the number of times that the program loops from S15 to S19 is less than the number of pictures inputted in the interval photography setting dialog (S18), the program waits by the photography interval inputted via the interval photography setting dialog, and then repeats the steps S15 onward. When the number of iterations is equal to or greater than the number of pictures inputted via the interval photography setting dialog (S18), the interval photography result dialog as shown in FIG. 11 is displayed and the program is terminated. FIG. 11 illustrates the number of successfully photographed pictures (number-of-photography counter) and the number of errors of photographed pictures. The number of errors of photographed pictures is a result of subtraction of the number-of-photography counter from the number of pictures inputted via the interval photography setting dialog.

Figure 12:
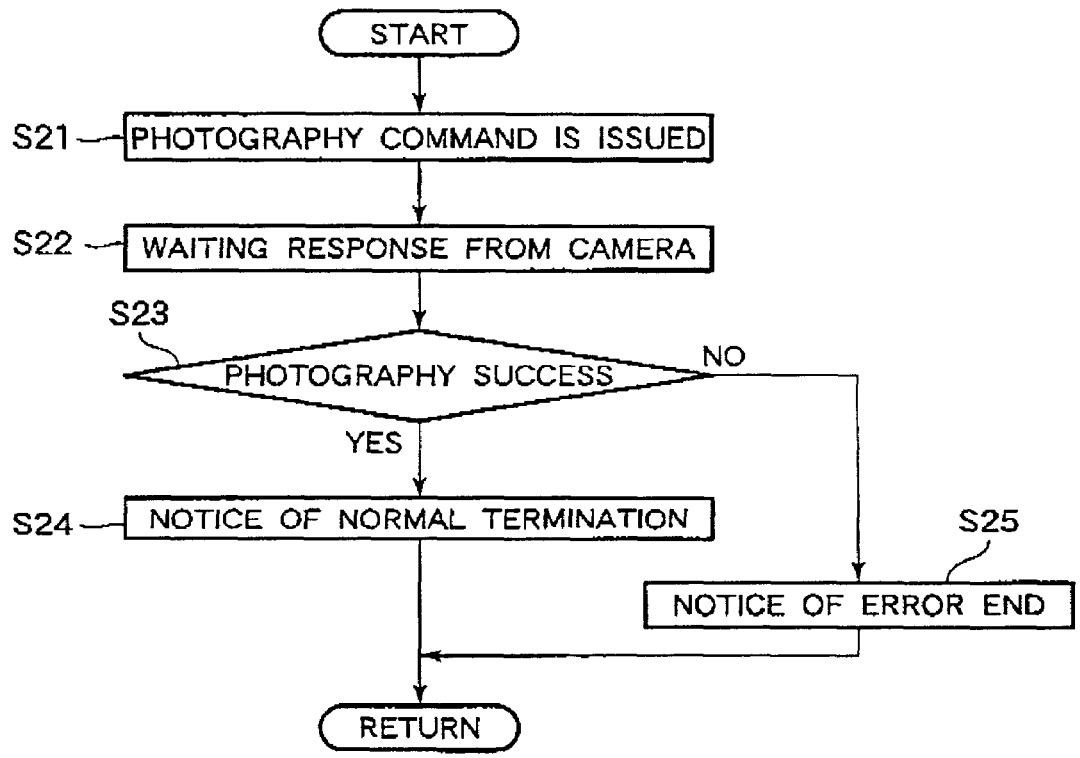
FIG. 12 is a flowchart illustrating the operation in the remote photography application software when a photography command is issued.

FIG. 12 is a flowchart for issuing a photography command under the control of the application software that runs on the computer 10. In any of the normal photography mode, timer photography mode, and interval photography mode, the computer 10 provides a photography command at predetermined timings to the electronic camera 20 (S21), and then waits a response from the camera 20 (S22). Upon receiving the photography command, the electronic camera 20 normally performs a series of preparatory operations such as adjustments of focus and exposure, and then performs photographing. Then, the electronic camera 20 indicates to the computer 10 as to whether the photography was successfully performed or not.

When the computer 10 receives a status representative of success of photography (S23), the computer 10 performs a normal termination process such as acquisition of photographed image data from the electronic camera 20 (S24). When the computer 10 receives a status representative of failure of photography, the computer 10 performs an error end process (S25).

Figure 13:
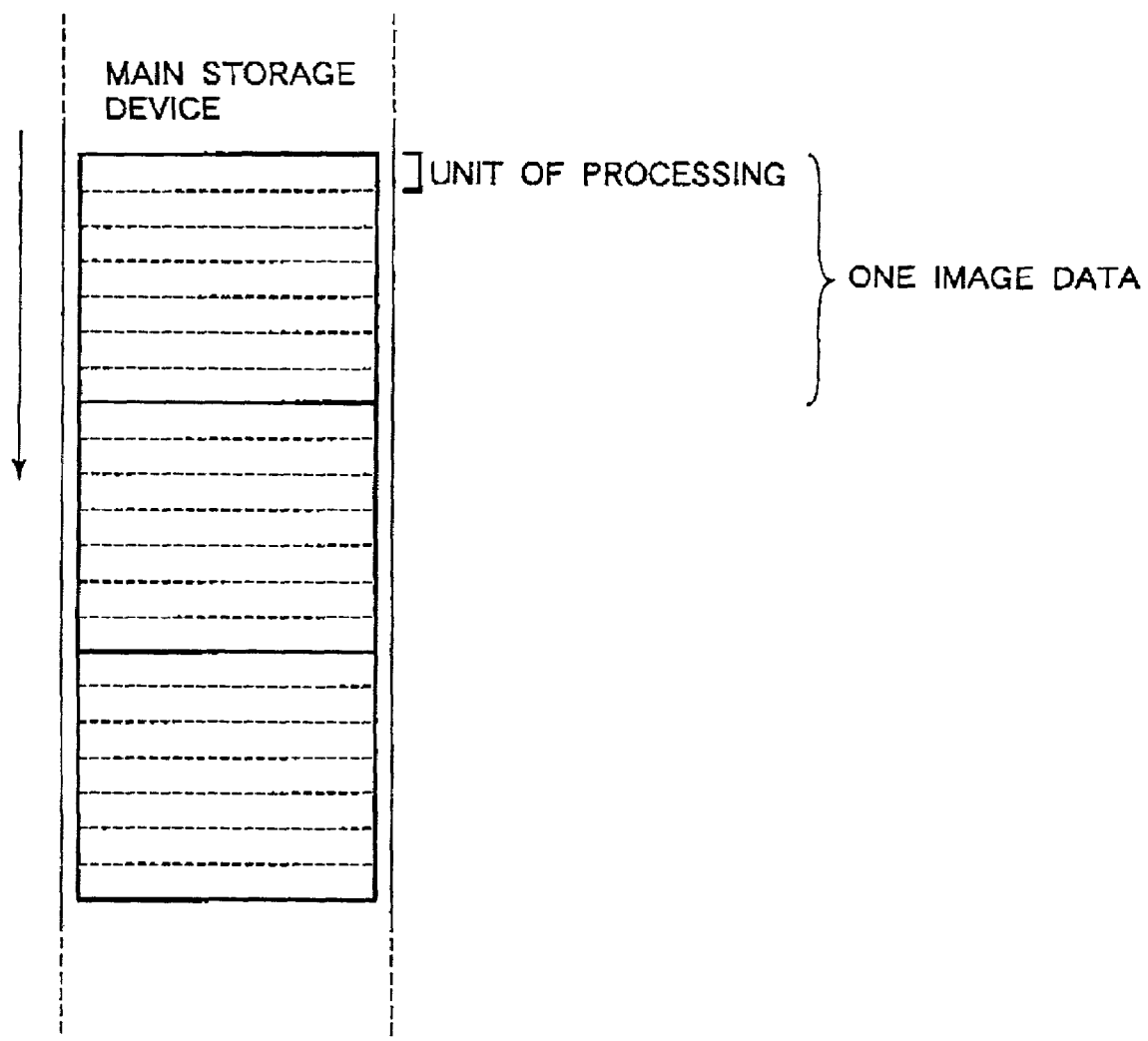
FIG. 13 illustrates the operation in a main storage apparatus 78 of the electronic camera 20.

A method of processing image data photographed by the electronic camera 20 will be described with reference to FIG. 13. The image data captured by the electronic camera 20 is first transferred to the main storage device 78 of the electronic camera 20. Thereafter, the image data is compressed using a known coding method such as JPEG and is stored as a file into the image storage device 80 of the electronic camera 20 or transferred to an external device (here, the computer 10).

The compression and coding of photographed images, the storage of the compressed images into the image storage device 80, and the transfer of the stored image to the external device are all time-consuming processes. Thus, an item of image data is divided into a plurality of blocks as shown in FIG. 13, and the image data is saved in an auxiliary storage device or transferred to the external device on a block-by-block basis. When one block has been processed, the process is interrupted in order to check whether any event such as depressing of the shutter button has occurred. Upon completing the check, the saving or transferring is resumed from the next adjacent block.

When all of the blocks in the image data in one item of image data have been processed, that item of image data is erased from the main storage device 78. However, if the electronic camera 20 takes a new picture before all of the blocks in the image data have been processed, the newly photographed picture is also stored in the main storage device 78 in such a way that the new image data is not overwritten on the image data previously stored in the main storage device 78. For this purpose, the image storage device 80 of the electronic camera 20 has an enough capacity for holding a plurality of items of image data concurrently.

Figure 14:
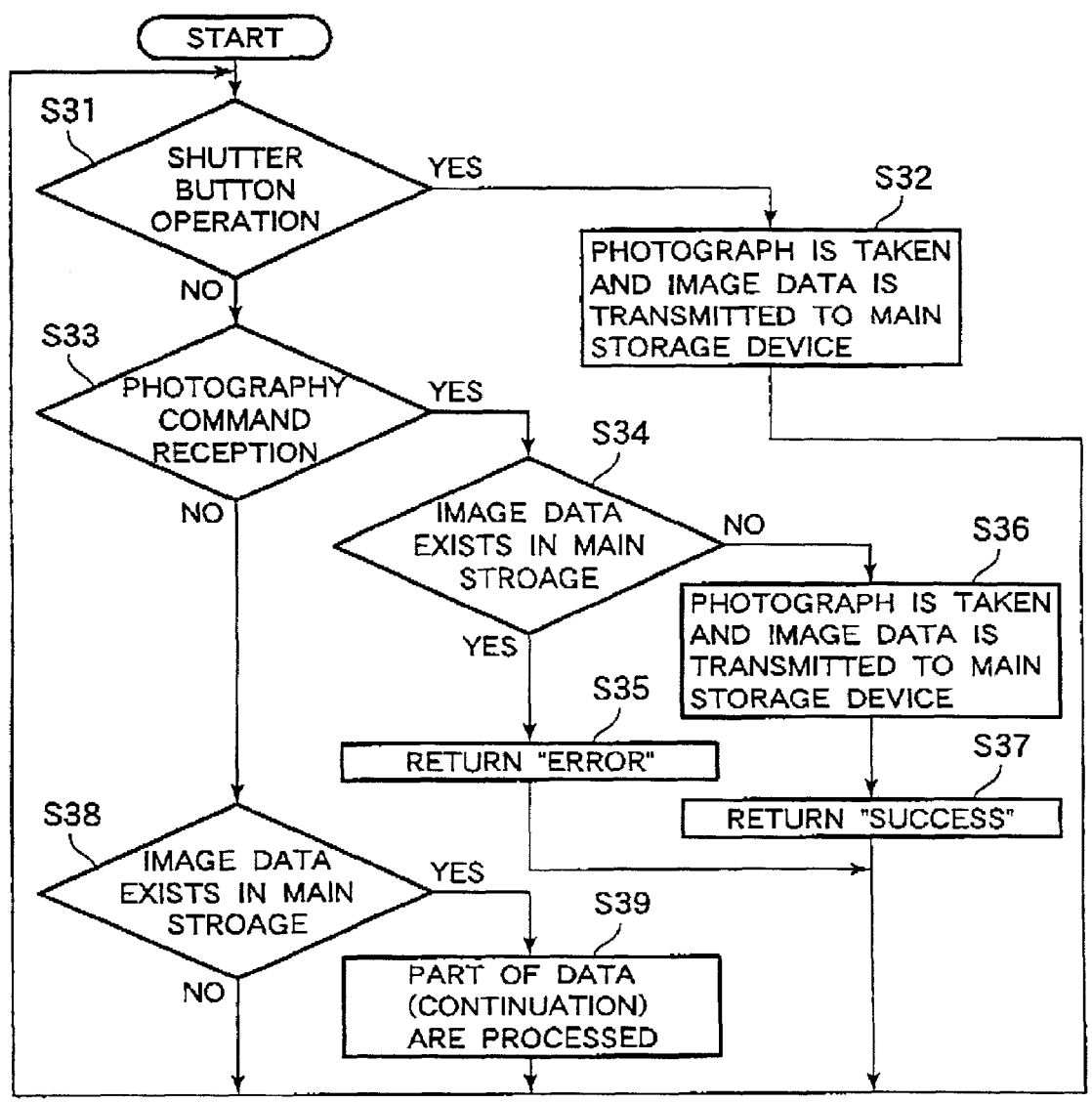
FIG. 14 is a flowchart, illustrating the operation of the electronic camera 20.

FIG. 14 is a flowchart illustrating the operation when the electronic camera 20 takes a picture. The operation when the electronic camera 20 takes a picture will be described with reference to FIG. 14. A controlling unit 86 of the electronic camera 20 operates on an event-driven principle. FIG. 14 illustrates a part of a message processing loop of the controlling unit 86 in simplified form, i.e., only a portion related to photographing and the associated data processing.

When the shutter button of the electronic camera 20 is depressed (S31), the photographing is performed and the photographed image data is stored into the main storage device 78 of the electronic camera 20 (S32). Thereafter, the program returns to a normal event processing loop.

Upon receiving a photography command from the external device (here, the computer 10), a check is made to determine whether image data to be processed is still present in the main storage device 78 of the electronic camera 20 (S34). In the present embodiment, the saving of the image data into the image storage device and the transferring of the image to the external device take precedence over the execution of the photography command issued from the computer 10. Therefore, if the main storage device 78 still holds image data to be processed, an error signal is returned to a device from which the photography command is issued (S35). If the main storage device 78 does not hold image data to be processed (S34), the photography command is executed and the photographed image data is stored into the main storage device 78 (S36). Thereafter, the "notice of normal termination" is returned to the device from which the photography command is issued and the program returns to the start of the message loop.

In the message loop, a check is made to determine whether the main storage device 78 still holds image data to be processed (S38). If the main storage device 78 still holds image data to be processed (S38), the compression, save, or transfer of the image data is carried out on a block-by-block basis as shown in FIG. 13 (S39).

As mentioned above, the present embodiment allows the electronic camera 20 to take a picture by the use of the shutter button 64 even when the electronic camera 20 is under the remote control of the computer 10. Moreover, even when the image data in the main storage device 78 (buffer memory) of the electronic camera 20 is still being processed, the process may be interrupted, thereby allowing the electronic camera to take a picture.

When the photography command is received from the computer 10, if the main storage device 78 does not hold image data to be processed, photographing may be effected. However, if the main storage device 78 still holds image data to be processed, the photography command is not accepted.

To summarize, priority is given to photographing by the use of the shutter button 64, processing the photographed image data, and photography command received from an external device, in this order.

Even when the system has been set to the timer photography mode or the interval photography mode by the external device, the aforementioned configuration allows the electronic camera to take a picture in response to actuation of shutter button 64 of the electronic camera 20 without canceling the operation mode specified by the external device.

As can be readily understood from the above description, according to the present invention, photographing can be effected by operating the shutter button of the camera even when the camera is being operating in the timer photography mode or in the interval photography mode specified by the external device, thereby preventing the user from losing good photographic opportunities.

The present invention is not limited to the aforementioned embodiment but can be varied in many ways within the scope of the following claims.

What is claimed is:

1. An imaging apparatus that can be actuated by a command from an external device, the apparatus comprising:
    a shutter switch actuated to output an instruction of photographing a subject;
    a receiver that receives a photography command from the external device;
    photographing means that photographs the subject in response either to the instruction by said shutter switch or to the photography command and outputs an image signal of the subject;
    a memory that temporarily stores the image signal output by said photographing means, said memory being capable of storing a plurality of pictures of the image signal;
    transfer means that transfers the image signal stored in said memory to a storage device; and
    a controller that controls the photographing operation of said photographing means,
    wherein said controller, during the transfer operation by said transfer means, permits the photographing operation by the shutter switch and inhibits the photographing operation by the photography command.

2. The electronic camera according to claim 1, wherein the external device issues the photography command for either a timer photography mode where photographing is performed after a specified length of time or an interval photography mode where photographing is performed at predetermined time intervals.

3. An electronic camera system having an electronic camera and a camera-controlling device,
    wherein the electronic camera includes:
    a shutter switch actuated to output an instruction of photographing a subject; and
    a receiver that receives a photography command from the camera-controlling device;
    photographing means that photographs the subject in response either to the instruction by said shutter switch or to the photography command and outputs an image signal of the subject;
    a memory that temporarily stores the image signal output by said photographing means, said memory being capable of storing a plurality of pictures of the image signal; and
    transfer means that transfers the image signal stored in said memory to a storage device,
    wherein the camera-controlling device includes:
    setting means that sets a timer photography mode where photographing is effected after a specified length of time or an interval photography mode where photographing is effected at predetermined time intervals; and
    issuing means that issues the photography command corresponding to the timer photography mode or the interval photography mode to the electronic camera;
    wherein the electronic camera, during the transfer operation by said transfer means, performs a photographing operation by the shutter switch and inhibits the photographing operation by the photography command.

4. An imaging apparatus, comprising:
    an operating switch actuated to output an instruction of photographing a subject;
    a photography-command receiving section that receives a photography command from an external device;
    a photographing section that photographs the subject in response either to the instruction by said operating switch or to the photography command and outputs an image signal of the subject;
    a processing section that performs on the image signal a predetermined process necessary to record the image signal;
    a recording section that records the image signal processed by said processing section in a storage device; and
    a controlling section that controls said photographing section, wherein, during the predetermined process on the image signal by said processing section, said controlling section permits the photographing operation by said operating switch and inhibits the photographing operation by the photography command.

5. An apparatus according to claim 4, wherein said processing section comprises:
    a memory that temporarily stores the image signal to be recorded by said recording section, said memory being capable of storing a plurality of pictures of the image signal;
    wherein said controlling section inhibits the photographing operation by the photography command while the image signal is stored in the memory.

6. A method of controlling an imaging apparatus that can be actuated by a command from an external device, comprising:
    a detecting step of detecting when a shutter switch is depressed to output an instruction of photographing a subject;
    a receiving step of receiving a photography command issued from the external device;
    a photographing step of photographing an image in response either to the instruction by the shutter switch or to the photography command and outputting an image signal of the subject;
    a storing step of temporarily storing the image signal output in the step of photographing into a memory, wherein said memory is capable of storing a plurality of pictures of the image signal;

a transferring step of transferring the image signal stored in the memory to a storage device; and a control step of controlling the photographing operation in said photographing step, wherein said control step includes, during the transfer operation in said transferring step, a step of permitting the photographing operation by the shutter switch and inhibiting the photographing operation by the photography command.

7. A computer-readable storage medium storing a program for making an imaging apparatus that can be actuated by a photography command issued from an external device execute:

a detecting step of detecting when a shutter switch is depressed to output an instruction of photographing a subject;

a receiving step of receiving a photography command issued from the external device;

a photographing step of photographing an image in response either to the instruction by the shutter switch or to the photography command and outputting an image of the subject;

a storing step of temporarily storing the image signal output in the step of photographing into a memory, wherein said memory is capable of storing a plurality of pictures of the image signal;

a transferring step of transferring the image stored in the memory to a storage device; and a control step of controlling the photographing operation in said photographing step, wherein said control step includes, during the transfer operation in said transferring step, a step of permitting the photographing operation by the shutter switch and inhibiting the photographing operation by the photography command.

8. A method of controlling an electronic camera system having an electronic camera and a camera-controlling device, comprising:

a detecting step of causing the camera-controlling device to detect when a shutter switch of the electronic camera is depressed to output an instruction of photographing a subject;

a setting step of causing the camera-controlling device to set either a timer photography mode where the electronic camera photographs a subject after a specified length of time or an interval photography mode where the electronic camera photographs a subject at specified time intervals;

an issuing step of causing the camera-controlling device to issue a photography command corresponding to the timer photography mode or the interval photography mode to the electronic camera;

a receiving step of causing the electronic camera to receive the photography command from the camera-controlling device;

a photographing step of causing the electronic camera to photograph the subject in response either to the instruction by the shutter switch or to the photography command and output an image signal of the subject;

a storing step of causing the electronic camera to temporarily store the image signal output in said photographing step into a memory, wherein the memory is capable of storing a plurality of pictures of the image signal;

a transfer step of causing the electronic camera to transfer the image signal stored in the memory to a storage device; and a step of, during the transfer operation in said transfer step, causing the electronic camera to photograph the subject by the shutter switch and inhibit the photographing operation by the photography command.

9. A computer-readable storage medium storing a program for making an electronic camera system that includes an electronic camera and a camera-controlling device execute:

a detecting step of causing the camera-controlling device to detect when a shutter switch of the electronic camera is depressed to output an instruction of photographing a subject;

a setting step of causing the camera-controlling device to set either a timer photography mode where the electronic camera photographs a subject after a specified length of time or an interval photography mode where the electronic camera photographs a subject at specified time intervals;

an issuing step of causing the camera controlling device to issue a photography command corresponding to the timer photography mode or the interval photography mode to the electronic camera;

a receiving step of causing the electronic camera to receive the photography command from the camera-controlling device;

a photographing step of causing the electronic camera to photograph the subject in response either to the instruction by the shutter switch or to the photography command and output an image signal of the subject;

a storing step of causing the electronic camera to temporarily store the image signal output in said photographing step into a memory, wherein the memory is capable of storing a plurality of pictures of the image signal;

a transfer step of causing the electronic camera to transfer the image signal stored in the memory to a storage device; and a step of, during the transfer operation in said transfer step, causing the electronic camera to photograph the subject by the shutter switch and inhibit the photographing operation by the photography command.

10. A method of controlling an imaging apparatus, comprising:

a detecting step of detecting an actuation of an operating switch to output an instruction of photographing a subject;

a receiving step of receiving a photographing command from the external device;

a photographing step of causing a photographing section to photograph the subject in response either to the instruction by said operating switch or to the photography command and outputs an image signal of the subject;

a processing step of performing on the image signal a predetermined process necessary to record the image signal;

a recording step of recording the image signal processed in said processing step in a storage device; and a controlling step of controlling the photographing step wherein said controlling step includes, during the predetermined process on the image signal in said processing step, a step of permitting the photographing operation by the operating switch and inhibiting the photographing operation by the photography command.

11. A computer-readable storage medium storing a program for making an image apparatus execute:

a detecting step of detecting an actuation of an operating switch to output an instruction of photographing a subject a subject;

a receiving step of receiving a photographing command from an external device;

a photographing step of causing a photographing section to photograph the subject in response either to the instruction by said operating switch or to the photography command and outputs an image signal of the subject;

a processing step of performing on the image signal a predetermined process necessary to record the image signal;

a recording step of recording the image signal processed in said processing step in a storage device; and a controlling step of controlling said photographing step, wherein said controlling step includes, during the predetermined process on the image signal in said processing step, a step of permitting the photographing operation by the operating switch and inhibiting the photographing operation by the photography command.

* * * * *

UNITED STATES PATENT AND TRADEMARK OFFICE
CERTIFICATE OF CORRECTION

| | | |
|---|---|---|
| PATENT NO. | : 7,012,636 B2 | Page 1 of 1 |
| APPLICATION NO. | : 09/951459 | |
| DATED | : March 14, 2006 | |
| INVENTOR(S) | : Koji Hatanaka | |

It is certified that error appears in the above-identified patent and that said Letters Patent is hereby corrected as shown below:

IN THE DRAWINGS
Sheet 11, Fig. 14, "STROAGE" (both occurrences, in items S34 and S38), should read --STORAGE--.

COLUMN 7
Line 55, "The electronic camera" should read --The imaging apparatus--.

Signed and Sealed this

Twenty-sixth Day of December, 2006

JON W. DUDAS
*Director of the United States Patent and Trademark Office*